Nov. 13, 1951  R. W. WALLACE ET AL  2,575,035
CAMERA, INCLUDING RAPID FILM THREADING AND RELEASING MEANS
Filed Jan. 17, 1947
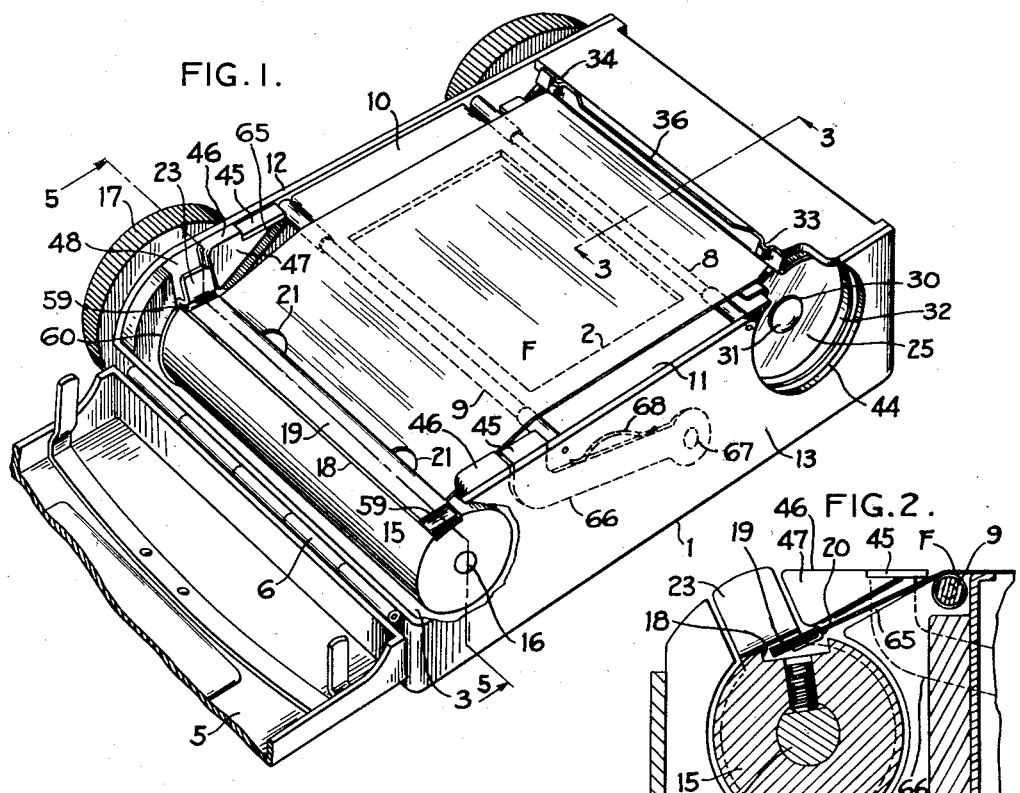
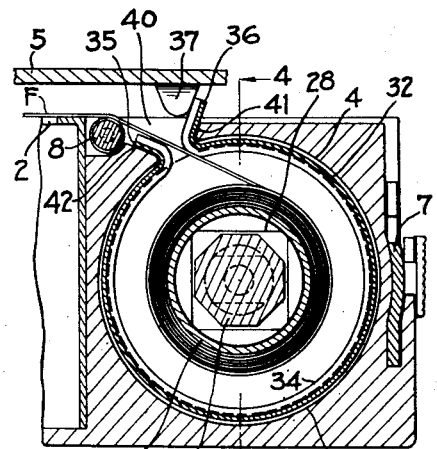
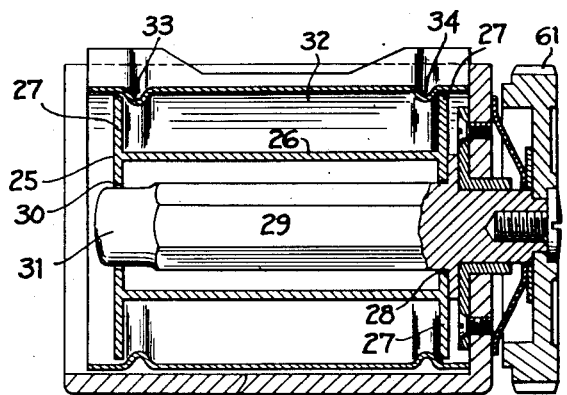
ROGER W. WALLACE
PAUL J. ERNISSE
INVENTORS.
ATTORNEYS Patented Nov. 13, 1951

2,575,035

UNITED STATES PATENT OFFICE 2,575,035

CAMERA, INCLUDING RAPID FILM THREADING AND RELEASING MEANS

Roger W. Wallace and Paul J. Ernisse, Rochester, N. Y., assignors to Eastman Kodak Company, Rochester, N. Y., a corporation of New Jersey Application January 17, 1947, Serial No. 722,712

13 Claims. (Cl. 95—31)

This invention relates to photography and particularly to a camera constructed to facilitate threading and unthreading film into the camera. One object of our invention is to provide a camera which can be loaded accurately and rapidly. Another object of our invention is to provide a camera-loading and unloading structure which is adapted for use with film of extremely small size. A further object of our invention is to provide a camera in which it will be difficult, if not impossible, to improperly load the film into the camera. Still another object of our invention is to provide a camera in which there is no chance of the film pulling out of a take-up hub after the film has been threaded thereto and to provide a camera structure in which the film will readily move away from the take-up hub when the film is rewound onto an original spool or into an original container. Other objects will appear from the following specification, the novel features being particularly pointed out in the claims at the end thereof.

In most roll film cameras, film is supplied on a spool, or in a retort, and when the film is to be loaded the spool or retort is placed in a supply chamber. The film is then drawn across an exposure frame; the end of the film or backing paper is then threaded into a slot and the film is wound onto the take-up hub, as exposures are made. There are many chances for error in loading such cameras, and one of the commonest difficulties is to have the end of the backing paper, or film, pull out of the slot in the take-up hub, so that the hub may be turned without moving film. In addition, there are the difficulties of loading the backing paper, or film, so that the film strip will lie accurately at right angles to the hub of the take-up member in order for the film to pass freely and smoothly through the camera. The smaller size cameras are generally more difficult to load than the larger ones and this is especially true in cameras which use exceedingly narrow film, such as 16-mm. or 20-mm., and in the somewhat larger sizes using 35-mm. film. There are, of course, advantages in our improved loading and unloading system for any width of film, but it is particularly noticeable with the very narrow films because of the size of the apparatus in which such films may be used. Our invention is particularly directed to improving the means for threading and unthreading film in such cameras. Our invention may be considered to be an improvement over the photographic film cartridge and spool for use therein shown in U. S. Patent 2,005,405, Wittel, June 18, 1935.

Coming now to the drawings wherein like reference characters denote like parts throughout:

Fig. 1 is a perspective view of a miniature camera on an enlarged scale with the camera back open for loading constructed in accordance with and embodying a preferred form of our invention;

Fig. 2 is an enlarged fragmentary section through a portion of the take-up chamber of the camera shown in Fig. 1;

Fig. 3 is a view similar to Fig. 2 but showing the supply film chamber of the camera shown in Fig. 1;

Fig. 4 is a transverse section through the supply film chamber taken on line 4—4 of Fig. 3; and Fig. 5 is a section through the take-up film chamber (parts being shown in somewhat distorted scale) and taken on line 5—5 of Fig. 1.

Our invention consists broadly of providing a camera having a supply chamber into which a film cartridge can be rapidly placed and in which it is difficult, it not impossible, to improperly position the suply of film; the camera also having a take-up chamber which can be accurately and quickly loaded, and in which the film automatically becomes disengaged from the take-up hub when film is returned to the supply chamber.

More specifically, we have shown our invention as applied to a miniature type of camera which, in the present instance, was designed to use film 20-mm. wide. Obviously, film of other, or in fact any, known widths could readily be employed. The camera consists of a camera body 1 having an exposure frame 2 on one end of which there is take-up chamber 3 and on the opposite end of which there is a supply chamber 4. A camera back 5 is, in the present instance, hingedly attached at 6 to the camera body to be moved to and from an operative position in which it makes a light-tight cover for the camera body and in which it may be latched by a suitable latch mechanism 7, partially shown in Fig. 3.

There are film-guiding rolls 8 and 9, one on each side of the exposure frame 2 and, in the present instance, the exposure frame is provided with flat side plates 10 and 11 inside of the side walls 12 and 13 of the camera which may be considered to form a table, or guide, to help thread film, as will be more fully described later. Both side plates 10 and 11 may be formed from a single plate having a single opening 2, if desired, to frame the exposure area.

The take-up film chamber 3 carries a hub member 15 which is attached to a shaft 16, terminating in a winding knob 17. The hub 15 is provided with a cut-out, or notch, 18 for the reception of a strengthening strip 19 carried on the end of a film F. This strengthening strip is preferably somewhat longer than the width of the film F and it may conveniently be made of a metal piece merely folded over against the film with a pair of flanges 20 extending through a pair of apertures 21 in the film to form a reinforcing bar extending transversely of the film.

The strengthening strip 19 is preferably made of less width than the slot 18 in the hub 15. It may be placed in the notch 18 by merely pressing the strengthening strip 19 downwardly and, if desired, a spring latch 23 may tend to hold the end of the strip down in the notch 18. Similar latches may be provided on each side of the camera body, only one being shown in Fig. 1, the other being broken away to show the camera construction. These spring latches may consist of washer-like members encircling shaft 16, as shown in Fig. 2, and having spring arms 23 extending outwardly through slots 48 which prevent the washers from turning.

The film cartridge may consist of a spool 25 having the usual hub 26 and flanges 27, as shown in Fig. 4. This spool is provided with a polygonal opening 28 to slide on the polygonal shaft 29 and it may be provided with a round opening 30 to be centered by the rounded end 31 of the shaft 29. Convolutions of film are wound on the hub 26, these convolutions being omitted from Fig. 4 for the sake of clearness. Around the outside of the spool and film is a spring sheath 32, which is generally cylindrical in shape, preferably including the inwardly-formed ribs 33 and 34 formed to prevent contact of the film with any material portion of the sheath. The two ends of the sheath 35 and 36 are flared outwardly, as shown in Fig. 3. These spring ends are normally pressed together by means of the spring in the material itself so that the sheath will rest on the flanges 27 of the spool. Fig. 3 shows the outwardly-flared edges 35 and 36 separated, this being their operative position when film is being wound through the camera since the camera cover 5 carries suitably-placed cams 37 for springing the sheath open when the cover is closed, as partially indicated in Fig. 3.

The supply film chamber 4 consists of a generally cylindrical container which, in the case of small cameras, can be either cut or molded in the material of which the camera body 1 is made. This cylindrical container is formed by the inner curved wall 39 and a slot 40 leads outwardly from the cylindrical container; the walls 41 and 42 of the slot being wider near the exposure frame 2 than at the inner side adjacent the cylindrical wall 39.

The operation of loading the camera can be carried out very rapidly and accurately. When the camera cover 5 is swung open, as shown in Fig. 1, the supply chamber 4 is open at the end 44 which extends directly through the camera side wall 13. Thus, in loading the camera, the film cartridge is slid axially through this opening 44 and onto the shaft 29. The outwardly-flared flanges 35 and 36 of the spring sheath are guided in the slot 40 and the strengthening strip 20 normally lies outside of these outwardly-flared flanges so that this can be quickly drawn out and it may rest on the guides 10 and 11 and may be moved along these guides over the roller 9 across spring latch elements 45 and across the upper surface 46 of the triangular-shaped guide elements 47 until it reaches the slots 48 through which the ends of the strengthening strip 19 may pass downwardly, snapping behind the spring latches 23. Guide elements 47 lie inside the side walls 12 and 13 and may be considered to form a part of these walls, although it is generally easier to make these walls of two laminations, rather than from one piece of material. These may be used to hold the strengthening strip in the slot 18. All this can be accomplished very quickly. The strip 19 is substantially flush with the surface of the hub 15 so that when the winding key 17 is turned, this strip will likewise be turned.

It will be noticed from Fig. 5 that the extreme ends 59 of the strengthening strip 19 are of a reduced cross section from the main folded portion of the reinforcing strip. Consequently, they lie substantially flush with the periphery of the hub 15 and, since this hub extends into recesses 60 in the side walls 10 and 11, after the knob 17 has been turned but a short distance, it will be impossible for the reinforcing bar 19 to come out of the slot. Thus, the spring latches 23 only temporarily hold the reinforcing bar in position until the knob 17 is turned. Of course, the convolutions of film F will hold the entire bar 19 in the slot by the time the first revolution is made and the reinforcing bar will thereafter be retained in the slot. This loading operation can be carried out extremely rapidly and without any particular care on the part of the operator because the bar 19 is always held accurately at right angles to the hub 15, and because the supply spool is also accurately mounted merely by sliding this spool on the post 29.

After all the exposures have been made, the film is rewound on the supply spool by turning the hub 29 through its winding knob 61. This turning causes the film F to move in a reverse direction and unwind from the hub 15 and as the last convolution of film leaves the hub, the reinforcing bar 19 will be brought opposite a guideway 65 which is substantially tangent to the hub 15 and which is slightly wider than the length of the strengthening member 19. Consequently, the reinforcing bar will move smoothly and easily out of its slot 18 up through the opposed guideways 65 (only one being shown in the drawing) until the latch members 45 are reached. These latch members, as shown in Fig. 1, are formed on the end of arms 66 pivotally mounted at 67 to the camera body and spring pressed downwardly into their operative position by the leaf spring 68. Consequently, when the bar 19 moves upwardly through the opposed guideways 65, the latch elements 45 move upwardly, permitting the bar to pass up out of the top of the exposure frame 2 and continue on until the reinforcing bar reaches the outwardly-flared ends 35 and 36 of the spring sheath. The operator then, using an upstanding flange 36 as a handle, slides the sheath and with it the film spool and convolutions of film axially out of the opening in the side wall 13 of the camera, so that the entire unloading movement, like the loading movement, takes place very rapidly.

The spring sheath 32 slides freely in the cylindrical container 39 because as soon as the camera cover 5 is raised, the cams 37 release the flanges 35 and 36, so that these flanges may move together, thus somewhat reducing the outside diameter of the sheath for its free sliding movement. We have found that this camera is extremely easy to load even when the camera is of extremely small size, and the width of the complete film cartridge is in the order of ⅞ of an inch. One of the reasons for the ease in loading is that after the film cartridge has been inserted the strengthening bar 19 may be rapidly slid across the flat side walls 10 and 11 of the exposure frame across the top of the spring latches 45 and across the flat pads 46 and the bar can be dropped down through the opposed guideways 49, and may be snapped behind the spring latches 23. If desired, these spring latches can be omitted because the reinforcing bar 19 will immediately become attached to the hub 15, or may be held in place in the slot 18 by turning the knob 17 a distance sufficient to catch the ends 59 of the strengthening strip beneath the circular guides 60.

While in our preferred form of camera a pair of guideways are provided for loading and unloading, it is obvious that only one pair of guideways may be employed, if desired, such as, either a guideway 49 for loading, or a guideway 65 for unloading. Obviously, both guideways are desirable.

We have described our apparatus as being a camera, as this is a preferred form of photographic apparatus to which the invention may be applied. However, the term "camera" is used in its broader sense to include a camera, a propector, or other photographic apparatus in which film may be threaded and wound from one spool to another.

In the specification where we refer to film, we propose to include in this term either a film alone or a film with a backing paper extending completely behind the full length of the film or attached only to the ends of the film, since all of these types are well known as being included in film cartridges. Obviously, the spring sheath can be omitted if there is sufficient material, such as backing paper, to protect the ends of the film strip against fogging during the loading operation. With very narrow film, however, it is much easier to use such a sheath and to omit backing paper entirely.

It will be noticed that we provide a camera in which there are separate paths for the film in loading and unloading, that is to say, in loading, the film moves down the pathways which are substantially radial to the hub 15 until the strengthening bar is caught in its slot 18 in the hub 15, but in unloading, this bar is moved through a separate pair of guideways 65 which are more or less tangentially arranged with respect to the hub 15. The reason for this construction is rather obvious since it provides an easy means for loading and an easy means for unloading the hub 15.

We claim:

1. In a roll-holding camera for use with film cartridges comprising convolutions of film wound on a spool and a transverse strip on the lead end wider than the film, the combination with a camera body having side walls, film chambers at each end between the side walls, of a film-winding hub mounted in a film chamber adapted to be turned to wind film, the ends of said hub extending into apertures in the side walls, the hub and side walls providing a means for retaining the transverse strip against the hub during a film-winding operation, and two pairs of guideways spaced to permit sliding movement of the transverse strip therein, one pair extending radially from the hub for loading, and the other pair extending tangentially therefrom for unloading.

2. In a roll-holding camera for use with film cartridges comprising convolutions of film wound on a spool and a transverse strip on the lead end wider than the film, the combination with a camera body having side walls, film chambers at each end between the side walls, of a film-winding hub mounted in a film chamber adapted to be turned to wind film, the ends of said hub extending into apertures in the side walls, the hub and side walls providing a means for retaining the transverse strip against the hub during a film-winding operation, and two pairs of guideways spaced to permit sliding movement of the transverse strip therein, one pair extending radially from the hub for loading, and the other pair extending tangentially therefrom for unloading, and means for covering the outer ends of the tangentially arranged pair of guideways except during an unloading operation.

3. A roll-holding camera for use with film cartridges comprising a hub, convolutions of film wound thereon, and a strengthening strip wider than the film extending transversely across the end of the film, said roll-holding camera comprising an exposure frame, a film supply chamber and a film take-up chamber at opposite ends of the exposure frame, a winding handle extending into each film chamber, a slotted hub in the take-up chamber, side walls on the camera, one on each side of the exposure frame, the supply and the take-up chambers, a removable camera back adapted to form a light-tight cover for the exposure frame, the film supply chamber and the film take-up chamber, means carried by the side walls of the take-up film chamber for guiding the strengthening strip, said means being spaced apart a distance greater than the width of the film and less than the length of the strengthening strip for engaging and guiding the ends of the strengthening strip, said means carried by the side walls of the take-up film chamber including one pair of spaced slots extending substantially radially of the slotted hub, said means including a second pair of spaced slots extending diagonally from the slotted hub to the edge of the exposure frame.

4. The roll-holding camera construction defined in claim 3 characterized in that the two pairs of spaced slots are separated by triangular-shaped guide elements whereby the strengthening strip may be loaded by passing the strengthening strip through the radial slots directly toward the slotted hub and into the slot thereof and may be moved from the slotted hub through the second set of slots to the exposure frame.

5. The roll-holding camera construction defined in claim 3 characterized in that the two pairs of spaced slots are separated by triangular-shaped guide elements whereby the strengthening strip may be loaded by passing the strengthening strip through the radial slots directly toward the slotted hub and into the slot thereof and may be moved from the slotted hub through the second set of slots to the exposure frame, and a third guideway for the strengthening strip comprising the two flat plates adjacent the side walls of the camera forming the lateral edges of the exposure frame and extending from the supply to the take-up spool chambers.

6. The roll-holding camera construction defined in claim 3 characterized in that the two pairs of spaced slots are separated by triangular-shaped guide elements whereby the strengthening strip may be loaded by passing the strengthening strip through the radial slots directly toward the slotted hub and into the slot thereof, and spring latch elements at each end of the slotted hub and adapted to engage the ends of the strengthening strip when said strip is pressed into the slot of the slotted hub to prevent said strengthening strip from moving back through the radial slots.

7. A roll-holding camera for use with film cartridges comprising a hub, convolutions of film wound thereon, and a strengthening strip wider than the film extending transversely across the end of the film, said roll-holding camera comprising an exposure frame, a film supply chamber and a film take-up chamber at opposite ends of the exposure frame, a winding handle extending into each film chamber, a slotted hub in the take-up chamber, side walls one on each side of the exposure frame, supply and take-up chambers, a removable camera back adapted to form a light-tight connection with the camera body for loading and unloading the camera, means carried by the side walls of the take-up film chamber for guiding the strengthening strip, said means being spaced apart a distance greater than the width of the film and less than the length of the strengthening strip for engaging and guiding the ends of the strengthening strip, said slotted hub being supported by the sides of the take-up spool chamber, guide members in the sides of the spool chamber substantially encircling the ends of the hub and spaced apart a distance more than the width of the film and less than the strengthening strip to retain the stiffening member in the slot of the slotted hub when said hub is turned from the spaced guide slots.

8. A roll-holding camera for use with film cartridges comprising a hub, convolutions of film wound thereon, and a strengthening strip wider than the film extending transversely across the end of the film, said roll-holding camera comprising an exposure frame, a film supply chamber and a film take-up chamber at opposite ends of the exposure frame, a removable camera back adapted to cover the supply chamber, the take-up chamber and the exposure frame to make a light-tight cover therefor, a winding handle extending into each film chamber, a slotted hub in the take-up chamber, side walls one on each side of the exposure frame, the supply and the take-up chambers, means carried by the side walls of the take-up film chamber for guiding the strengthening strip, said means being spaced apart a distance greater than the width of the film and less than the length of the strengthening strip for engaging and guiding the ends of the strengthening strip, said means carried by the side walls of the take-up film chamber including one pair of spaced slots extending substantially radially of the slotted hub, said means including a second pair of spaced slots extending diagonally from the slotted hub to the edge of the exposure frame, the radial pair of slots and the diagonally extending slots both terminating at points adjacent each other and adjacent the slotted hub.

9. The roll-holding camera as defined in claim 8 characterized in that spring latch elements lying in and partially obstructing the radial guide slots leading to the slotted core whereby the strengthening strip may be latched by pushing said strip through said guide slots and into the slot of the slotted hub.

10. A roll-holding camera for use with film cartridges comprising a hub, convolutions of film wound thereon, and a strengthening strip wider than the film extending transversely across the end of the film, said roll-holding camera comprising an exposure frame, a film supply chamber and a film take-up chamber at opposite ends of the exposure frame, a removable camera back for forming a light-tight cover for the supply chamber, the exposure frame and the take-up chamber, a winding handle extending into the take-up chamber, a slotted hub attached to the winding handle and rotatably mounted in the take-up chamber, side walls on each side of the exposure frame, supply and take-up chambers, means carried by the side walls of the take-up film chamber for guiding the strengthening strip, said means being spaced apart a distance greater than the width of the film and less than the length of the strengthening strip for engaging and guiding the ends of the strengthening strip, said means carried by the side walls of the take-up chamber including one pair of spaced slots extending substantially radially of the slotted hub, said means including a second pair of spaced slots extending diagonally of the slotted hub to the edge of the exposure frame, the radial pair of slots and the diagonally extending slots terminating at points adjacent each other and adjacent the slotted hub, spring latch elements lying in and partially obstructing the radial guide slots leading to the slotted core whereby the strengthening strip may be latched by pushing said strip through said guide slots and into the slot of the slotted hub, the ends of the diagonally extending slots leading from the slotted hub up to the exposure frame and terminating adjacent the exposure frame having latches mounted on the camera and spring-pressed to normally lie over the slot ends adjacent the exposure frame.

11. The roll-holding camera as defined in claim 10 characterized in that the ends of the diagonally extending slots leading from the slotted hub up to the exposure frame and terminating adjacent the exposure frame have latches mounted on the camera and spring-pressed to normally lie over the slot ends adjacent the exposure frame, the pivotal points for the spring latches lying beneath the exposure frame to allow the latches to move when the strengthening strip is moved upwardly through the diagonally positioned slots toward the exposure frame.

12. The roll-holding camera as defined in claim 10 characterized in that the ends of the diagonally extending slots leading from the slotted hub up to the exposure frame and terminating adjacent the exposure frame have latches mounted on the camera and spring-pressed to normally lie over the slot ends adjacent the exposure frame, the outer faces of said latches being normally held in alignment with the lateral edges of the exposure frame to form a slideway along which the strengthening strip may slide in loading toward the radially positioned guide slots.

13. A roll-holding camera for use with film cartridges comprising a hub, convolutions of film wound thereon, and a strengthening strip wider than the film extending transversely across the end of the film, said roll-holding camera comprising an exposure frame, a film supply chamber and a film take-up chamber at opposite ends of the exposure frame, a removable camera back adapted to form a light-tight cover for the supply chamber, the take-up chamber and the exposure frame, a winding handle extending into the take-up chamber, a slotted hub in the take-up chamber, side walls on the camera one for each side of the exposure frame, the supply and the take-up chambers, means carried by the side walls of the take-up chamber for guiding the strengthening strip, said means being spaced apart a distance greater than the width of the film and less than the length of the strengthening strip for engaging and guiding the ends of the strengthening strip, said means carried by the side walls of the take-up chamber including a pair of spaced slots one in each side wall extending substantially radially of the slotted hub whereby the transverse strengthening strip may be moved through said pair of spaced slots and into the slotted hub.

ROGER W. WALLACE.
PAUL J. ERNISSE.

REFERENCES CITED

The following references are of record in the file of this patent:

UNITED STATES PATENTS

| Number | Name | Date |
|---|---|---|
| 540,786 | Greninger et al. | June 11, 1895 |
| 930,327 | Wheeler | Aug. 3, 1909 |
| 2,009,972 | Maschev et al. | July 30, 1935 |
| 2,140,445 | Mihalyi | Dec. 13, 1938 |
| 2,150,106 | Roessel | Mar. 7, 1939 |
| 2,366,147 | May | Dec. 26, 1944 |

FOREIGN PATENTS

| Number | Country | Date |
|---|---|---|
| 329,907 | France | Aug. 8, 1903 |
| 137,136 | Austria | Apr. 10, 1934 |
| 617,810 | Germany | Aug. 8, 1935 |